April 29, 1924.
J. J. McEWAN
1,491,995
MOLDING MACHINE
Filed May 17, 1920      2 Sheets-Sheet 1
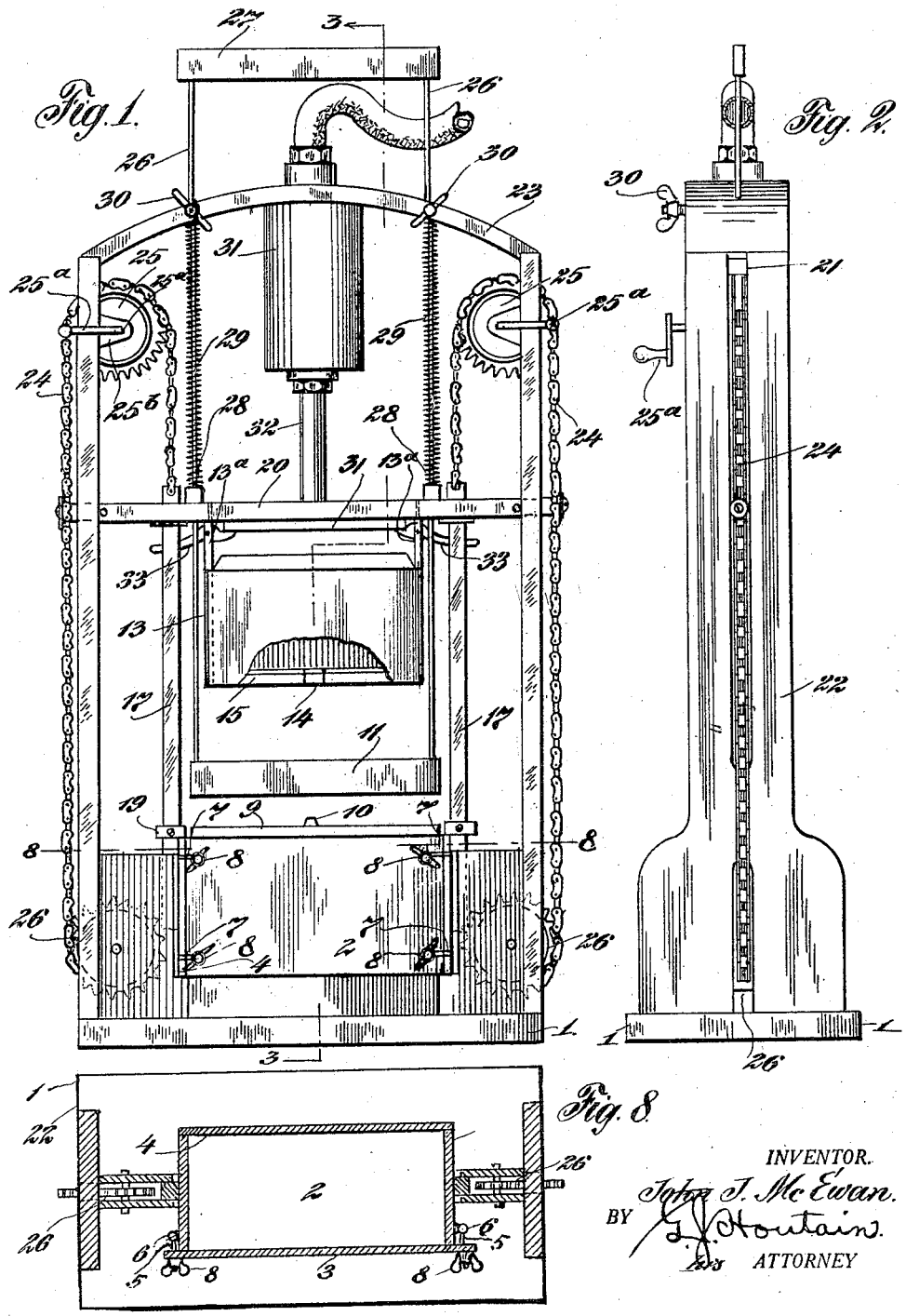
INVENTOR.
John J. McEwan.
BY
ATTORNEY April 29, 1924.
J. J. McEWAN
1,491,995
MOLDING MACHINE
Filed May 17, 1920
2 Sheets-Sheet 2
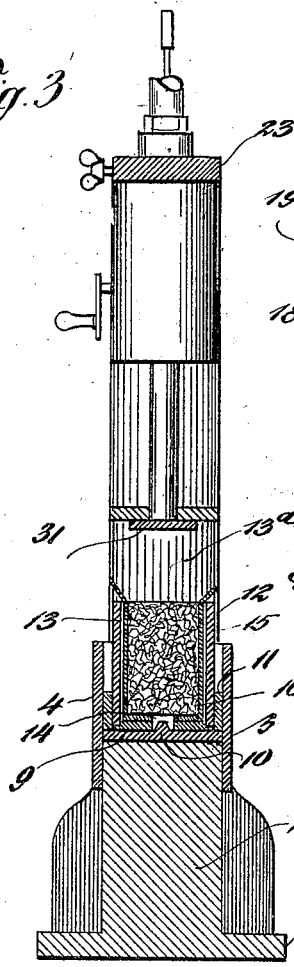
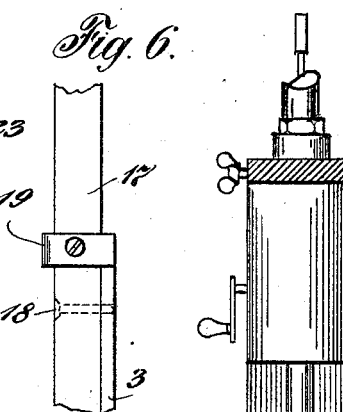
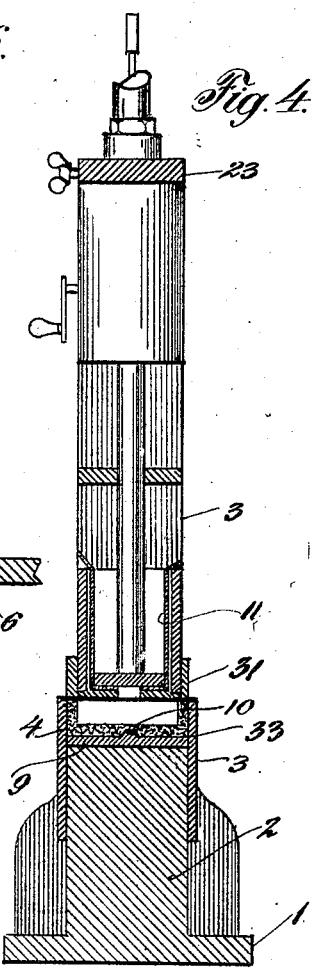
INVENTOR.
John J. McEwan
BY
his ATTORNEY Patented Apr. 29, 1924.

1,491,995

UNITED STATES PATENT OFFICE.

JOHN J. McEWAN, OF TRENTON, NEW JERSEY.

MOLDING MACHINE.

Application filed May 17, 1920. Serial No. 381,891.

*To all whom it may concern:*

Be it known that I, JOHN J. McEWAN, a subject of the King of Great Britain, and resident of Trenton, in the county of Mercer and State of New Jersey, have invented certain new and useful Improvements in Molding Machines, of which the following is a specification.

This invention relates to molding machines, more particularly machines for automatically forming, molding and pressing plastic clay into hollow articles; the principal object of the invention being to provide an efficient machine of this character embodying means for producing a receptacle of rectilinear or other shape having a bottom and side walls formed integral, such as sinks, crocks, or other hollow articles; further objects being to embody simplicity of construction and durability with general effectiveness of operation.

In carrying out my invention I employ reciprocating and telescopically arranged parts comprising: a clay-carrying and feeding means, a box snugly encasing said means, an endless presser horizontally engaging around said box, a flask engaging around said presser, a removable horizontal partition within said flask, a base-block extended vertically within said flask and supporting said partition, a reciprocating plunger for forcing clay through said clay-carrying means, means for operating said parts, and other novel features, all as hereinafter fully described and specifically set forth in the annexed claims.

In the accompanying drawings forming part of this specification, Figure 1 is a front view of my improved molding machine. Fig. 2 is an end view. Fig. 3 is a vertical sectional view taken on the line 3—3 of Fig. 1. Fig. 4 is a similar view showing the several parts of the device in different correlative positions; and Figures 5, 6 and 7 are fragmentary views of details of the machine. Fig. 8 is a sectional plan view on the line 8—8 of Fig. 1.

In the example of my invention illustrated by the drawings, 1 indicates a metal base having a rectilinear block 2 extended upwardly therefrom; surrounding this block and snugly fitting its four sides is a metal flask 3, having a removable wall 4 which is fastened by means of swinging bolts 5, the heads of said bolts being pivoted on lugs 6, of the end walls of the flask, and extended through slots 7 of said removable wall, said bolts being fixed within said slots by means of thumb nuts 8. The flask 3 is further provided with a removable partition or bottom 9, having a spur 10 extended from its upper surface.

In telescopic engagement within the flask 3 is a reciprocating metal sleeve making a presser 11, which surrounds a reciprocating box 12, having a removable front wall 13 and extended end walls 13$^a$, which are fixed to a cross-head hereinafter described. The bottom of the box 12 is provided with a circular opening 14, which registers over the spur 10 of the partition 9. Within the box 12 is a removable receptacle 15, having a circular opening 16 through its bottom which registers over the opening 14 of the bottom box 12.

Extended upwardly from each end wall of the flask 3 is a reciprocating rod 17, these are fixed to said end walls by means of screws 18 and sleeves 19, and they respectively extend through a reciprocating horizontal cross-head 20, which traverses vertical slots 21 of uprights 22 extended upwardly from the respective end parts of the base 1, and they are bridged at their upper ends by means of an arched cross-beam 23. Fixed to the upper end of each rod 17 is one end of a chain 24; these chains respectively extend upwardly from said rods, over sprocket wheels 25 and thence downwardly under and partly around sprocket wheels 26$^b$, and upwardly to the lower ends of said rods 17, to which they are fixed, whereby rotary movement given to said sprocket wheels imparts vertically slidable movement to said rods. The sprocket wheels 25 are fixed to lateral shafts $a$, which are journaled through hangers $b$, and they are respectively provided with a crank 25$^a$, said cranks adapted for rotating said sprocket wheels. The sprocket wheels 26$^b$ are journaled through and between uprights $c$, and fixed to lateral shafts $d$; said uprights also acting as guide means for directing the vertical movements of the rods 17.

The cross-head 20, at each of its extended ends, is connected to and between the chains 24, whereby when the rods 17 slide through the cross-head in one direction said cross-head moves in the opposite direction.

Extending upwardly and vertically from each end wall of the reciprocative sleeve 11, is a rod 26, these rods slidably engage bearing-holes formed through the cross beams 23, and they also extend freely through openings formed in the cros-head 20. Coiled around each rod 26 and bearing between the beam 23 and fixed collars 28 of the rods 26 are contractile springs 29, having a normal tendency to force the presser-sleeve 11 downwardly towards the upper surface of the partition 9 of the flask 3. As a means for holding the presser-sleeve 11 in arbitrarily set position, I provide set screws 30, which are threaded laterally through the beam 23 and bear at their inner ends against the rods 26; when the apparatus is being operated these set screws are loosened to allow the springs 29 to move the presser-sleeve 11 downwardly. Carried by the beam 23 is a suitable power means for operating the plunger 31, as a hydraulic press 32, not shown in detail, as it forms no part of the present invention and I may employ other means for operating said plunger; the plunger 31 is connected with the piston-rod 32ᵃ of the press 32 and it is given downward movement when the piston of the press is actuated.

The plunger 31 is maintained normally in position shown in Fig. 1 of the drawings by means of trip-pawls 33, when the apparatus is at rest.

In the operation and use of the invention, when it is desired to form a hollow clay vessel, as 35 Fig. 4 of the drawings, the front wall 13 of the box 12 is first removed, then the receptacle 15 is removed and loaded with a desirable quantity of plastic clay of any suitable character, said receptacle is then replaced within said box and the front wall of said box is also replaced. The parts are then moved into correlative positions approximating the positions illustrated by Fig. 3 of the drawings by means of the cranks 25ᵃ, the flask 3 being at the upper end of its vertical stroke and the sleeve 11 and box 12 being telescoped therein. Then the plunger 31 is given downward movement, and as it snugly fits within the receptacle 15, its downward movement forces the plastic clay out through the openings 16 and 14, around the spur 10 and spreads it beneath the box 12, said box being lifted by rotating the sprocket wheels 25 and held in place a sufficient distance above the partition to allow for the desired depth of the bottom of the vessel being formed, further downward movement of the plunger 31 forces clay beneath the lower edge of the presser-sleeve 11 and moves said sleeve upwardly against the tension of the springs 29, for a sufficient distance to form the vertical walls of the vessel; then downward movement of the plunger 31 is stopped by cutting off the means for actuating it. By means of the cranks 25ᵃ, and the chain, wheel and rod connections the flask 3 is moved to its lowermost position and the box 12 to its uppermost position, also shown in said Fig. 1. The plunger 31 is then moved upwardly and brought into engagement with the trip-pawls 33; the sleeve 11 is placed and set in required position above the, now formed, clay vessel to permit of lateral removal of said vessel and its supporting partition 9, the presser sleeve 11 being manually lifted and held in lifted position by means of the set-screws 30.

The finished vessel, being in moist condition, when it leaves the press, is allowed to remain on the partition 9, for a sufficient length of time to dry out before it is subjected to the customary baking and hardening process. Therefore, I provide a plurality of partitions 9 for the flask 3, so that the machine may be continuously used while its product is drying out, and I can rapidly produce a large quantity of vessels.

While I have illustrated and described a machine for producing rectilinear vessels, it is obvious that cylindrical vessels or vessels of other cross sectional contour may be produced by changing the shape of the telescopical parts; other changes in detail of the several parts of the device may be employed without departing from the spirit and scope of my invention.

Having thus described my invention, what I claim as new and desire to secure by Letters Patent, is:

1. In a machine of the character described, a clay-containing and feeding receptacle, a reciprocating plunger, reciprocating box encasing said clay-containing receptacle, a reciprocating spring-yieldable presser sleeve engaging around said encasing box, a reciprocating flask engaging around said presser-sleeve, a removable partition within said flask, a base-block extended within said flask, and means for actuating said reciprocating parts, said box and said flask adapted to move in opposite directions.

2. In a machine of the character described, a clay-containing and feeding receptacle comprising a bottom and side walls, said bottom having an opening therethrough, and a reciprocating plunger, and a reciprocating box encasing said receptacle and having an opening through its bottom, and a reciprocating spring-yieldable presser-sleeve engaging around said box, and a reciprocating flask engaging around said presser-sleeve, and a removable partition within said flask, and a base block extended within said flask, and means for actuating said reciprocating parts, whereby they are moved in opposite directions.

3. In a machine of the character described, a clay containing and feeding receptacle having an opening through its bottom, and a reciprocating plunger adapted to move within said receptacle, and a reciprocating box encasing said receptacle, said box having an opening through its bottom which registers with the said opening of the container bottom, and a reciprocating and spring-yieldable presser engaging around said box, and a reciprocating flask engaging around said presser, and a removable partition within said flask, said partition having a spur which registers with the said opening of the receptacle and its box, and a base-block extended within said flask and supporting said partition, and means for actuating said reciprocating parts, whereby they are moved in opposite directions.

4. In a machine of the character described, a clay-containing and feeding receptacle having an opening through its bottom, and a reciprocating plunger adapted to move within said receptacle, and a reciprocating box encasing said receptacle, said box having a removable side and an opening through its bottom which registers with said opening of the bottom of said clay-containing receptacle, and a reciprocating and spring-yieldable presser-sleeve engaging around said box, and a reciprocating flask engaging around said presser-sleeve, said flask having a removable side, and a removable partition within said flask, and a base-block extended within said flask and supporting said partition, and means for actuating said reciprocating parts, whereby they move in opposite directions.

5. In a machine of the character described, the combination of a clay-containing and feeding receptacle, a reciprocating plunger and means for operating said plunger, a reciprocating casing for said receptacle, a reciprocating and spring-yieldable presser-sleeve engaging around said casing, a reciprocating flask engaging around presser-sleeve, a removable partition within said flask, and a base-block extended within said flask, and a cross-head carrying said casing, and upright reciprocating rods carrying said presser, and springs for actuating said presser, and upright rods connected with said flask and extended through said cross-head, and chains connected to said rods and to said cross-heads, and sprocket wheels engaging said chains, whereby rotation of said sprocket wheels reciprocates said clay-carrying and feeding receptacle and said flask in opposite direction for pressing and forming clay within said flask, and means for supporting said parts.

Signed at New York, in the county of New York and State of New York, this third day of May, A. D. 1920.

JOHN J. McEWAN.